(12) United States Patent
Lazier et al.

(10) Patent No.: US 10,162,709 B1
(45) Date of Patent: Dec. 25, 2018

(54) INCREMENTAL BACKUPS FOR REMOVABLE MEDIA

(71) Applicant: Amazon Technologies, Inc., Seattle, WA (US)

(72) Inventors: Colin Laird Lazier, Seattle, WA (US); Masataka Kubo, Seattle, WA (US); Bryan James Donlan, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 15/360,864

(22) Filed: Nov. 23, 2016

(51) Int. Cl.
*G06F 3/06* (2006.01)
*G06F 11/14* (2006.01)

(52) U.S. Cl.
CPC ........ *G06F 11/1451* (2013.01); *G06F 3/0605* (2013.01); *G06F 3/065* (2013.01); *G06F 3/067* (2013.01); *G06F 11/1461* (2013.01); *G06F 11/1464* (2013.01); *G06F 11/1466* (2013.01)

(58) Field of Classification Search
CPC ..... G06F 11/1461; G06F 3/065; G06F 3/0652
See application file for complete search history.

(56) References Cited

U.S. PATENT DOCUMENTS

| | | | |
|---|---|---|---|
| 8,281,093 B1 | 10/2012 | Krishnan et al. | |
| 2010/0318575 A1* | 12/2010 | Murphy | G06F 11/1451 707/802 |
| 2014/0081919 A1* | 3/2014 | Matsumoto | G06F 11/3495 707/652 |
| 2015/0081639 A1* | 3/2015 | Jin | G06F 11/1451 707/644 |
| 2017/0206018 A1* | 7/2017 | Nara | H04L 67/1095 |
| 2017/0277596 A1* | 9/2017 | Kyathanahalli | G06F 11/1453 |
| 2017/0364415 A1* | 12/2017 | Formato | G06F 11/1461 |

* cited by examiner

*Primary Examiner* — Edward J Dudek, Jr.
(74) *Attorney, Agent, or Firm* — Davis Wright Tremaine LLP

(57) ABSTRACT

Techniques for storing incremental backups in long-term storage are described herein. A backup data set is generated from a set of data to backup and a deletion time for that backup data set is determined. A scheduled time period to perform the backup is selected based at least in part on a requested time period to perform the backup. The requested time period is altered if the performing the backup at the requested time period would produce a period of high resource contention at the destination for the backup. The backup is then stored at the destination at the scheduled time.

20 Claims, 11 Drawing Sheets

INCREMENTAL BACKUPS FOR REMOVABLE MEDIA

BACKGROUND

Modern computer systems are frequently implemented as distributed collections of computer systems operating collectively within one or more host computer system environments. Such computer systems typically utilize and produce large amounts of data, which are archived or otherwise backed up so that various states of the computer system resources can be restored in the event of unforeseen losses. Long-term storage services may be used for data that is infrequently accessed and stored in redundant, or durable, storage for relatively long periods of time. Conversely, short-term storage services may be used for data that is frequently accessed or that requires less durability. Backup data may be infrequently accessed because the need to access it typically arises in an emergency. Conversely, backup data may be frequently or infrequently updated, either daily, weekly, monthly, or according to some other schedule. Backup data may also require high durability because, as mentioned previously, the need to access such backup data typically arises in an emergency.

Problems with storage utilization or storage efficiency may arise with short-term storage of backup data such as, for example, for storing daily or weekly backups. Such problems may arise when the backup data it is stored using a long-term storage service as backup data is typically stored in archival or long-term storage. For instance it is often difficult to fully utilize the storage resources in a cost-effective manner. Additionally, the relatively short lifetime of the data, compared to the relatively long time to prepare and store it may make such storage very inefficient. Additional problems may arise due to the resource costs of accessing data distributed across multiple archive locations. Such storage inefficiencies of short-term backup data may lead to increased costs of the distributed computer systems and poor resource utilization.

BRIEF DESCRIPTION OF THE DRAWINGS

Various techniques will be described with reference to the drawings, in which.

DETAILED DESCRIPTION

Figure 1:
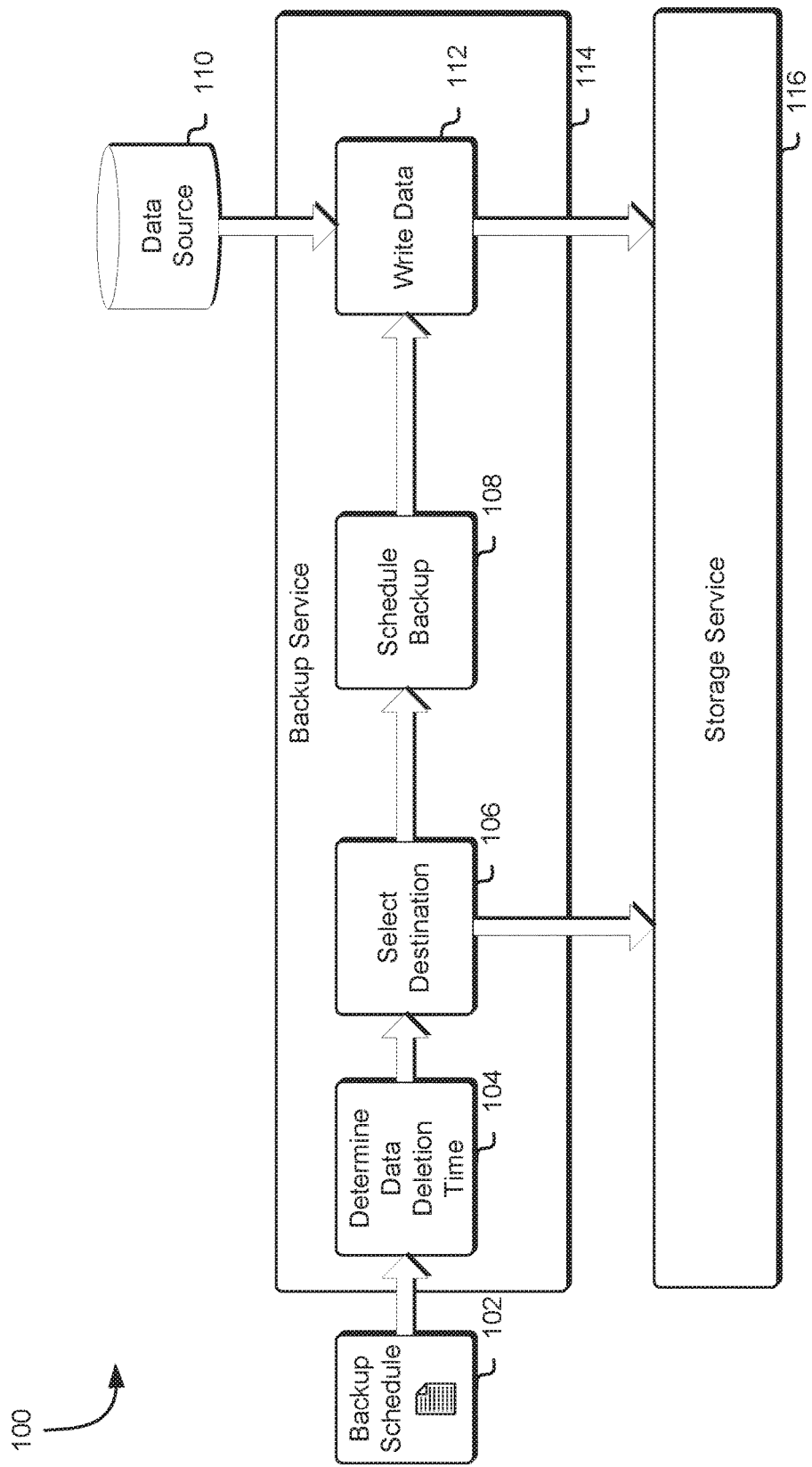
FIG. 1 illustrates an example environment where incremental backups are stored in long-term data storage.

The following disclosure describes techniques for using characteristics of data storage systems and services to increase the efficiency of storing short-term backups while minimizing media access. A customer of a computing resource service provider that provides data storage and backup services may specify a backup schedule for the retention of the customer's data. As an example, consider a customer with a set of data that needs to be backed up on a regular basis. The set of data may include purchase records, or inventory data, or source code, or some other data. The customer might specify that a full backup of all of the data should be made every three months and that full backup should be retained indefinitely (e.g., for as long as the customer maintains an account in good standing). The customer might also specify weekly backups that are retained for a month (e.g., for four weeks), and daily backups that are retained for a week (i.e., for seven days). Thus, at any time, the customer can restore data from any quarterly backup, from any week for the last four weeks, or from any day for the last week. In this example, the quarterly backup can be efficiently stored in long-term storage as a full backup, but the weekly and daily backups require processing in order to be stored efficiently.

The techniques described here take advantage of some properties of archival storage systems (i.e., long-term data storage systems or, more simply, long-term storage) to store more ephemeral data such as short-term backups. One example of an archival storage system is a tape storage system. A tape storage system, described in more detail below, uses removable media (i.e., tapes) that can be mounted into tape drives. In an enterprise tape storage system, the tapes are typically mounted and unmounted using tape robots. One advantage of a tape storage system is that an arbitrary number of tapes can be associated with each tape drive and, correspondingly, with each tape rack because the tape media is removable. This property provides for highly concentrated data throughput at the tape drive or tape rack.

When performing backups of computer system data, the backup data needs to be available when needed. Such backups are typically required when the primary data source has been lost, so a request for the backup data can come at any time, and can be a result of some catastrophic failure of some other system or service. A long-term backup is infrequently accessed, long-lived, and must be durably or redundantly stored so that it may always be recovered. A quarterly full backup that persists forever is an example of a long-term backup. However, short-term backups also exist such as, for example, weekly backups that are stored for a month or daily backups that are stored for a week. Such short-term backups can be very inefficient because resource usage to prepare the backup, write the backup, and retrieve the backup, if needed, can quickly overwhelm any measure of efficiency. For example, if it takes six hours of drive access time to prepare and store a backup that persists for three years, the preparation time is a minimal percentage. Conversely, if it takes six hours of drive access time to prepare and store a backup that persists for one week, the proportion of time spend in preparation becomes more significant.

Using the example above, where a customer wants to have access to quarterly backups forever, weekly backups for a month, and daily backups for a week, a backup system performs operations to have access to the data. The data can be sent to the backup system using, for example, a network, or the backup system may be provided with a locator for the data using, for example, a uniform resource identifier ("URI"). In the example described above, the data is at the customer's location but, as may be imagined, the data can come from any viable data source.

Once the data is provided to the backup service, the data is first processed in order to store it efficiently in an archival storage system. In the techniques described here, a backup schedule is analyzed to determine the deletion time of the data set to be backed up. In an embodiment, the deletion time of the data set to be backed up is provided by the customer in the backup schedule. In another embodiment, the deletion time of the data set to be backed up is determined based, at least in part, on a backup durability of the backup (i.e., the length of time that a particular backup remains usable to restore the data). In another embodiment, a deletion time is determined based on a range of potential deletion times so that, for example, all deletion times that occur within a defined twelve hour period are grouped together. In another embodiment, a deletion time may be calculated based at least in part on the method used to store the backup.

The deletion time is the time that the data is no longer needed to restore backup data. A deletion time may be specified down to a microsecond, second, minute, hour, day, week, month, or year. For example, if a data backup includes a full backup every week, and incremental daily backups that are based on the full backup, then a full backup can be deleted on the fourteenth day after the backup. Thus, the deletion time for such a full backup is a date fourteen days in the future.

Once a deletion time is determined, the backup data is grouped with other sets of data with the same deletion time. As much as possible, data with the same deletion times will be grouped together on a single storage volume so that, on the deletion time, all of the data on the storage volume can be deleted or, in an embodiment, the storage volume can be discarded and/or reused to store subsequent data sets.

Additionally, periods of high resource contention can be identified such as when, for example, a large number of backups are scheduled to occur. Such periods of high resource contention are mitigated by distributing the backups around the scheduled time so that, for example, one-hundred backups scheduled for midnight can be rescheduled so that they are evenly spread out over the course of several hours at around midnight. One way of mitigating periods of high resource contention is to schedule a data pull at a different time, so that the time of the backup can be determined in advance. Another way of mitigating periods of high resource contention is to allot a time slot to a customer and perform that customer's backup at that allotted time. Another way of mitigating periods of high resource contention is to refuse to perform a particular backup at the requested time so that it may be performed at a less impactful time.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

FIG. 1 illustrates an example environment 100 where incremental backups are stored in long-term storage in accordance with an embodiment. In the example environment 100 illustrated in FIG. 1, a backup service 114 receives a backup schedule 102 that details a schedule for backups of a particular data source or sources. The backup schedule 102 may include a list of data sources to backup, one or more desired or required scheduled times for those backups, one or more desired lifetimes for those backups (i.e., how long the backup should be retained), the type of backup requested, and other data and/or metadata associated with the backup schedule 102. As an example, a backup schedule such as the backup schedule 102 specifies a data source such as the data source 110 and one or more schedules for backing up that data source. A first schedule may specify that the data source 110 should be fully backed up every three months (i.e., quarterly) and that those quarterly backups should be retained indefinitely. In the first schedule, the period of the backup (also referred to herein as a "backup period"), which is a time duration, is three months because the backup of the data should occur every three months and the durability of the backup (also referred to herein as a "backup durability"), which is also a time duration, is indefinite. A second schedule may specify that the data source 110 should be fully backed up weekly and that those weekly backups should be retained for four weeks. In the second schedule, the backup period is a week and the backup durability is four weeks. A third schedule may specify that the data source 110 should be incrementally backed up daily and that those daily backups should be retained for a week. In the third schedule, the backup period is a day and the backup durability is a week (or seven days). Such a backup schedule allows the data to be recovered any day for the past week, any week for the past four weeks, or any quarter indefinitely. In this backup schedule, the daily backups for a week are considered short-term backups because the backup durability is relatively short. In this backup schedule, the weekly backups for a month may also be considered short-term backups due to their four-week backup durability.

When performing backups of computer system data, the speed at which backup data is accessible is important in many contexts. For example, when a primary data source has been lost, a backup dataset may be used to restore the primary data source. In some cases, a request for the backup data can come at any time, and can often be a result in problems with or even failure of some other system or service. A backup dataset (also referred to herein simply as a "backup") may be long-term (i.e., stored for a long period of time) or short-term (i.e., stored for a shorter period of time). The backup may be stored using removable media such as, for example, magnetic tapes, disk drives, optical drives, flash drives, or other removable media. A long-term backup is infrequently accessed, long-lived, and is often durably or redundantly stored so that it may be recovered for some amount of time (e.g., an amount of time required to comply with policies or regulations). For example, a quarterly backup that persists for an indefinite period of time (i.e., that has an indefinite or unspecified backup durability) is an example of a long-term backup. However, short-term backups also exist such as, for example, weekly backups that are stored for a month or daily backups that are stored for a week. Such short-term backups can be inefficient to store and access because resource usage to prepare the backup, write the backup, and retrieve the backup, if needed, can quickly overwhelm any measure of efficiency. For example, if it takes six hours of drive access time to prepare and store a backup that persists for three years, the preparation time is a minimal percentage. Conversely, if it takes six hours of drive access time to prepare and store a backup that persists for one week, the proportion of time spend in preparation becomes more significant.

It should be noted that, unless otherwise specified or made clear by context, as used herein, an "incremental" backup refers to an individual backup of a scheduled set of backups. So, for example, the second full weekly backup of a four week backup cycle (i.e., a weekly backup from two weeks ago that is retained for four weeks) is an incremental backup. However, an incremental backup may also refer to a partial backup that is generated from a previous full backup or from a previous incremental backup. Such a partial incremental backup includes only the differences from the previous backup to the current backup as described herein. Where such an incremental backup is used to refer to such a partial backup, it will be explicitly stated or made clear by context. Such incremental backups may also be referred to herein as "deltas."

The backup service 114 may be a collection of computing resources that operate collectively to process requests to store and/or access backup data. The computing resources configured to process requests to store and/or access backup data include at least one of: computer systems (the computer systems including processors and memory), networks, storage devices, executable code, services, processes, modules, or applications. The computing resources configured to process requests to store and/or access backup data may also include virtual systems that are implemented on shared hardware hosted by, for example, a computing resource service provider. The backup service 114 may be implemented as a single system or may be implemented as a distributed system, with a plurality of instances operating collectively to process requests to store and/or access backup data. The backup service 114 may operate using computing resources (e.g., databases) that enable the backup service 114 to locate and retrieve backup data quickly, to allow backup data to be provided in responses to requests for the backup data (e.g., restore requests). For example, the backup service 114 may maintain stored backup data in a manner such that, when a request to restore a set of backup data is received, the backup data can be located and provided (or streaming data object can be initiated) in a response to the request. As noted, backup data stored in the backup service 114 may be organized into data objects. The data objects may have arbitrary sizes except, in some embodiments, may have constraints on size or durability. Thus, the backup service 114 may store numerous data objects of varying sizes. The backup service 114 may store the numerous data objects in storage resources controlled by the backup service 114, may cause the numerous data objects to be stored using resources controlled by some other service, or may use a combination of these storage locations. The backup service 114 may also cause the numerous data objects to be redundantly stored using some redundancy encoding technique, may cryptographically encode the numerous data objects, or may use a combination of these and/or some other data preprocessing techniques. The backup service 114 may also operate as a key value store that associates data objects with identifiers of the data objects that may be used by a user to retrieve or perform other operations in connection with the data objects stored by the backup service 114. The backup service 114 may also generate metadata associated with the data objects that may be stored with the data objects.

When the backup service 114 receives the backup schedule 102, the backup service 114 may first analyze the backup schedule 102 to determine the scope and type of backup that is being requested, as described herein. Based at least in part on the backup schedule 102 and the type of backup, the backup service 114 may first determine a data deletion time 104 for the backup. The data deletion time is an important factor in selecting the destination 106 for the backup. A data deletion time is the date upon which a set of data stored for a backup is no longer deleted. So, for example, a backup schedule may store full backups weekly and incremental backups daily in order to provide the ability to restore a daily backup every day for the previous week. A full backup stored on day one of a backup schedule must be retained for as long as that full backup is needed to restore data. If the last incremental backup that needs the full backup from day one is stored on day seven, the last day that the last incremental backup that needs the full backup from day one can be recovered is on day thirteen. Accordingly, the full backup that is stored on day one has a deletion time on day fourteen.

In another example, an incremental backup that is stored on day two is no longer needed after day nine and so may typically have a deletion time on day ten. However, in an embodiment where an incremental backup uses previous incremental backups to recover data rather than, for example, the previous full backup, the incremental backup on day two is needed to restore the incremental backup for days three through seven, and so the incremental backup that is stored on day two may also have a deletion time of day fourteen, as described above. More complex backup methods may reduce the length of time that a full or incremental backup is stored using the storage service 116. In an embodiment, the storage service 116 is an archival storage service, which provides long-term, durable storage for data objects. For example, a backup method that stores reverse incremental backups and is configured to restore backup data from later data using the reverse incremental may reduce the deletion time (and thus the amount of backup data stored). Accordingly, because the deletion time is based at least in part on the schedule and method of storage of the backup data, the backup service 114 analyzes the backup schedule 102 to determine the data deletion time 104 based at least in part both the backup schedule (i.e., the backup durability and period) as well as the method of storage used for the backup in the storage service 116.

Once the deletion time is determined for a backup data set, the backup service may next select a destination 106 for that backup data set using the storage service 116. The destination is based at least in part on the deletion time. For example, a set of backup data may have a deletion time that is fourteen days in the future. The backup service may select a destination 106 for that backup data set by requesting a destination that already has previously stored data with a deletion time that is fourteen days in the future. For example, a storage location in a storage service 116 may have initially stored a set of data with a ninety day lifetime. On day seventy-six of that ninety days, that set of data would have a fourteen day lifetime remaining (i.e., would have a deletion time that is fourteen days in the future). By selecting a destination 106 that that already has previously stored data with a deletion time that is fourteen days in the future, both sets of data can be deleted on the same day, thus minimizing media access to the destination on the deletion time.

The destination may also be based at least in part on other deletion times for other backups for other customers of the backup service 114. For example, if a plurality of customers store backup data, using the same redundancy and encoding, and for the same period of time (i.e., each of the plurality of customers are storing data with the same deletion time), then all of these backup data sets can be stored in the same destination, thus minimizing media access to the destination on the deletion time. It should be noted that it is not required that the data sets with the same deletion time are backup data. It is, for example, common to store data that persists for thirty days. Such data from a plurality of data sources can be backup data, not backup data, or a combination of data types.

The backup service may then schedule the backup 108, and when the backup is scheduled, may write 112 the backup data set from the data in the data source. The process of scheduling the backup is designed to provide the data sets needed for the destination at the same time, but without causing spikes of resource contention in the backup service 114 or the storage service 116. The process of scheduling the backup is described in more detail herein.

In order to compute an incremental backup as described herein, the backup service may retrieve a last full backup or a previous incremental backup from a storage service such as the storage service 116. As used herein, the term "last full backup" denotes the most recent full back up. That is, a full backup is the last full backup until a more recent full backup is produced according to the backup schedule 102 (i.e., for a particular period and duration of a backup). A last full backup retrieved from the storage service 116 is, the example illustrated in FIG. 1, a last full backup of the data source 110. The last full backup may be retrieved from the storage service 116 when it is needed to, for example, compute incremental backups. In an embodiment, incremental backups are generated from the last full backup so that, for example, if there is a full backup on day one, the partial (or incremental) backup of day two is generated from the last full backup from day one and the changes since that last fill backup and the partial (or incremental) backup of day three is also generated from the last full backup from day one and the changes since that last full backup. In another embodiment, partial backups are computed from previous partial backups so that, for example, if there is a full backup on day one, the partial (or incremental) backup of day two is generated from the last full backup from day one and the changes since that last full backup but the partial (or incremental) backup of day three is generated from the partial backup from day two and the changes since that partial backup.

In the example illustrated in FIG. 1, the backup schedule 102 is illustrated as being delivered to, or provided to, the backup service 114. In an embodiment, the backup schedule 102 is a new backup schedule that must be analyzed by the backup service 114 as described below and the scheduled backups in the backup schedule added to a list of backups maintained by the backup service. In another embodiment, the backup schedule 102 is a previously received backup schedule that is stored by the backup service 114 and used to generate backups according to the schedule. For example, a backup schedule that specifies that a data source should be fully backed up every three months (i.e., quarterly) and that those quarterly backups should be retained indefinitely, that specifies that the data source should be fully backed up weekly and that those weekly backups should be retained for four weeks, and that specifies that the data source should be incrementally backed up daily and that those daily backups should be retained for a week may have been previously received by the backup service 114 and stored therein. The quarterly, weekly, and daily backups are then scheduled by the backup service 114 and repeatedly performed until the schedule is changed.

As with the backup service 114, the storage service 116 may be a collection of computing resources that operate collectively to process requests to store and/or access data such as, for example, archival data. The computing resources configured to process requests to store and/or access data include at least one of: computer systems (the computer systems including processors and memory), networks, storage devices, executable code, services, processes, modules, or applications. The computing resources configured to process requests to store and/or access data may also include virtual systems that are implemented on shared hardware hosted by, for example, a computing resource service provider. The storage service 116 may be implemented as a single system or may be implemented as a distributed system, with a plurality of instances operating collectively to process requests to store and/or access data. The storage service 116 may operate using computing resources (e.g., databases) that enable the storage service 116 to locate and retrieve data quickly, to allow data to be provided in responses to requests for the data. For example, the storage service 116 may maintain stored data in a manner such that, when a request to retrieve a set of data is received, the data can be located and provided (or streaming data object can be initiated) in a response to the request. As noted, data stored in the storage service 116 may be organized into data objects. The data objects may have arbitrary sizes except, in some embodiments, may have constraints on size or durability. Thus, the storage service 116 may store numerous data objects of varying sizes. The storage service 116 may store the numerous data objects in storage resources controlled by the storage service 116, may cause the numerous data objects to be stored using resources controlled by some other service, or may use a combination of these storage locations. The storage service 116 may also cause the numerous data objects to be redundantly stored using some redundancy encoding technique, may cryptographically encode the numerous data objects, or may use a combination of these and/or some other data preprocessing techniques. The storage service 116 may also operate as a key value store that associates data objects with identifiers of the data objects that may be used by a user to retrieve or perform other operations in connection with the data objects stored by the storage service 116. The storage service 116 may also generate metadata associated with the data objects that may be stored with the data objects.

Although not illustrated in FIG. 1, the backup service 114 and/or the storage service 116 may generate metadata associated with the backup schedule and/or the various components of the backups (e.g., the contents of a particular backup data set, the deletion time of a particular backup data set, etc.) and may store this metadata in storage associated with the backup service 114, in storage associated with the storage service 116, or with the data objects stored in the storage service 116.

Figure 2:
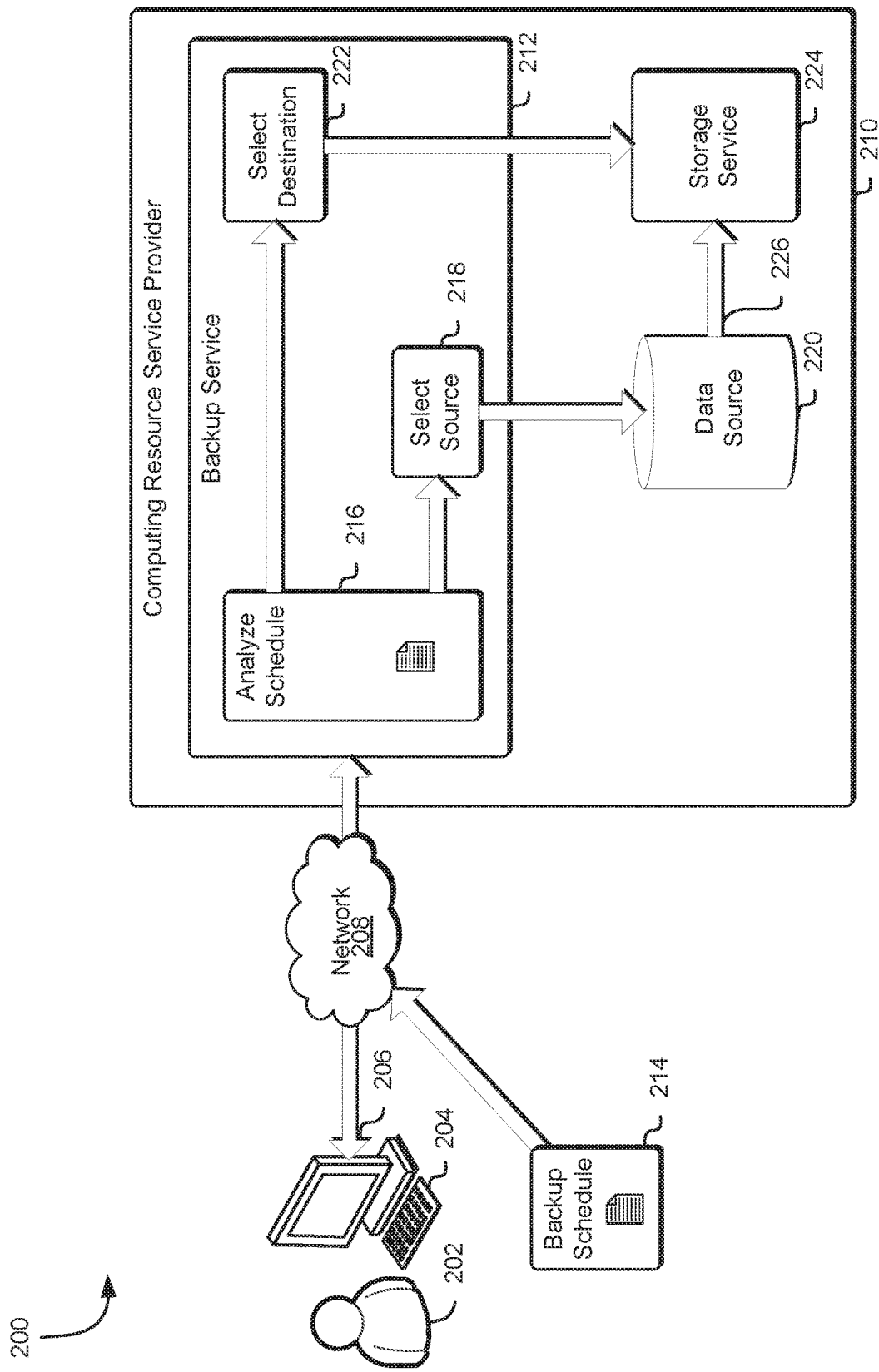
FIG. 2 illustrates an example environment where scheduled backups are analyzed using a backup service and the backups are stored in long-term data storage.

FIG. 2 illustrates an example environment 200 where scheduled backups are analyzed using a backup service and the backups are stored in long-term storage as described in connection with FIG. 1 and in accordance with an embodiment. In the example environment 200 illustrated in FIG. 2, a user 202 may use a client computing device 204 to connect 206 to a variety of services provided by a computing resource service provider 210. The user 202 may use the client computing device 204 to connect 206 to the computing resource service provider 210 over a network 208 such as those networks described herein. The computing resource service provider 210 may provide a distributed, virtualized, and/or datacenter environment within which one or more applications, processes, services, virtual machines, and/or other such computer system entities may be executed. The user 202 may be a person, or may be a process running on one or more remote computer systems, or may be some other computer system entity, user, or process.

Commands from the user 202 to the computing resource service provider 210 may originate from an outside computer system or from within the computing resource service provider environment. The commands to connect 206 to the computing resource service provider 210 may be sent to the computing resource service provider 210 and/or the services operating in the environment therein, without the direct intervention of the user 202 (i.e., commands to connect 206 to the computing resource service provider 210 may be generated automatically in response to one or more events). The user 202 may be a privileged user associated with a customer of the computing resource service provider 210. The user 202 may also be a privileged user associated with the computing resource service provider 210.

The computing resource service provider 210 may provide access to one or more host machines, may provide access one or more virtual machine instances as may be operating thereon, or may provide access to one or more services in an environment therein. The one or more services provided by the computing resource service provider 210 may also be implemented as and/or may utilize one or more virtual machine instances as may be operating on host machines operating within the computing resource service provider 210 environment. For example, the computing resource service provider 210 may provide a variety of services to users including, but not limited to, the user 202 and the users may communicate with the computing resource service provider 210 via an interface such as a web services interface or any other type of interface. While the example environment illustrated in FIG. 2 shows a single connection or interface to the computing resource service provider 210, each of the services operating in an environment therein may have its own interface and, generally, subsets of the services may have corresponding interfaces in addition to or as an alternative to the single interface.

In an example of a type of service operating within the environment of the computing resource service provider 210, a virtual computer system service may be a collection of computing resources configured to instantiate virtual machine instances on behalf of a customer such as the user 202. The user 202 is the customer associated with the backup data set or the customer associated with the backup data request. That is, the user 202 that requests the backup by, for example, generating the backup schedule 214, is the customer of the computing resource service provider 210 that is associated with the backup data set and/or the customer associated with the backup data request. The user 202 may become associated with the backup data set and/or the backup data request as a result of owning the data set and/or requesting the backup (i.e., as a result of generating the backup data request or generating the backup schedule 214).

The customer may interact with a virtual computer system service (via appropriately configured and authenticated API requests) to provision and operate virtual machine instances that are instantiated on physical computing devices hosted and operated by the computing resource service provider 210. The virtual computer system service may also be configured to manage virtual machine instances to, for example, instantiate virtual machine instances and/or to manage the migration of virtual machine instances. The virtual machine instances may be used for various purposes, such as to operate as servers supporting a website, to operate business applications or, generally, to serve as computing power for the customer. Other applications for the virtual machine instances may be to support database applications, electronic commerce applications, business applications, and/or other applications.

As described above, a backup service 212 of a computing resource service provider 210 may first receive a backup schedule 214 that, in the example illustrated in FIG. 2, is provided by the user 202 using the client computing device 204 used to connect 206 to the computing resource service provider 210 over a network 208. The backup service 212 may first analyze 216 the schedule as described herein and, as a result of that analysis may select the source 218 for the data that is to be backed up according to the backup schedule 214 and may also select a destination 222 for the data that is to be backed up according to the backup schedule 214. In the example illustrated in FIG. 2, the source for the data that is to be backed up is the data source 220, which is located within the computing resource service provider environment. In an embodiment, the data source 220 is located within a computing environment of the user 202. In another embodiment, the data source 220 is located within a computing environment of a third party. In yet another embodiment, the data source 220 is a distributed data source and is located in a combination of locations including, for example, a computing resource services provider environment, a user computing environment, and/or a third-party computing environment.

In the example illustrated in FIG. 2, the destination for the data that is to be backed up is the storage service 224, which is the same as the storage service 116 described at least in connection with FIG. 1. At the scheduled time for the backup, data from the data source 220 is provided 226 to the storage service 224 as described herein.

Figure 3:
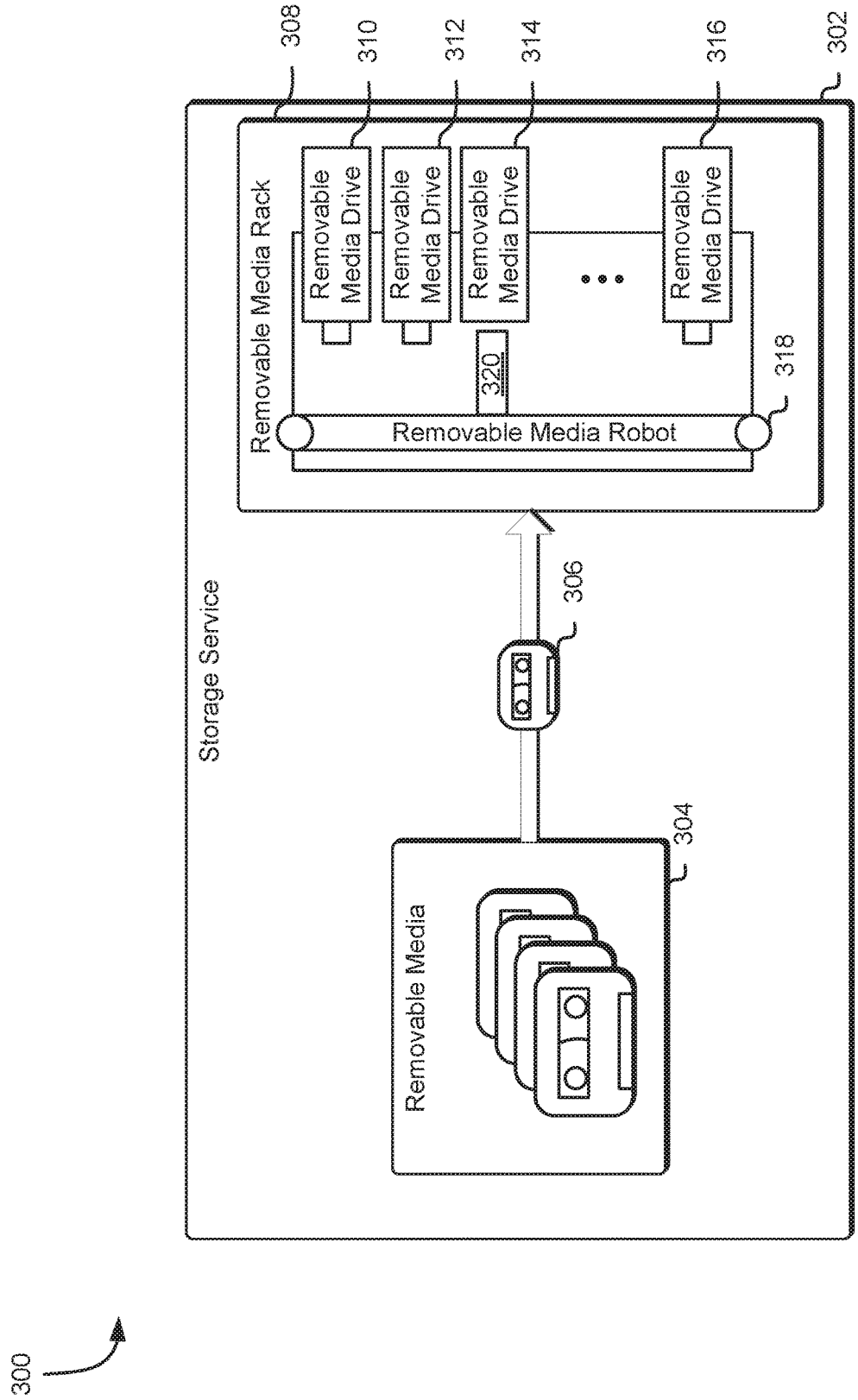
FIG. 3 illustrates an example environment detailing an storage service for storing backups incrementally in long-term data storage.

FIG. 3 illustrates an example environment 300 detailing a storage service for storing backups incrementally in long-term storage as described in connection with FIG. 1 and in accordance with an embodiment. In the example environment 300 illustrated in FIG. 3, the storage service 302 is a removable media-based storage service (e.g., a magnetic tape storage service), but as may be contemplated, an storage service that is a disk-based storage service, or an storage service that is a volatile-memory-based storage service, or an storage service that uses a combination of these and/or other such storage modalities may be considered as within the scope of the present disclosure.

In the storage service 302 illustrated in FIG. 3, a set of removable media 304 is used to store data. Each removable medium (e.g., magnetic tape, flash drives, disk drives in a rack, Blu-ray™ disks, etc.) of the set of removable media 304 may store data objects such as, for example, a set of backup data, part of a set of backup data, redundancy data for sets of backup data or partial sets of backup data, or metadata for sets of backup data. Each removable medium of the set of removable media 304 may include a plurality of such data objects based on the size of the data objects and the capacity of the tape. When a removable medium is needed to store data or retrieve data, the removable medium is provided 306 to a removable media rack 308 so that it may be mounted in a removable media drive for reading and/or writing. In the example illustrated in FIG. 3, a removable media rack 308 holds a plurality of removable media drives (e.g., removable media drive 310, removable media drive 312, removable media drive 314, and removable media drive 316). The removable media rack 308 may be one of a plurality of removable media racks managed and/or controlled by the storage service 302.

When the removable medium is provided 306 to the removable media rack 308, a removable media robot 318 associated with the removable media rack may mount the removable medium in an available removable media drive. One removable media robot 318 may be associated with a plurality of removable media racks. In the example illustrated in FIG. 3, the removable medium 320 is to be mounted in the removable media drive 314 that is empty (i.e., that does not have a removable medium mounted).

Each of the components of the storage service 302 has a resource lifetime associated with the viability of that resource and a resource cost associated with using that resource. For example, a removable medium of the set of removable media 304 may be limited to a certain number of uses (or write/erase cycles) or a certain amount of time (e.g., weeks, months, or years) that the removable medium may be kept in the set of removable media 304. A removable media drive such as the removable media drive 310 may be limited to a certain number of hours of use reading or writing removable media. This number of hours may also be expressed as an annual failure rate or a reliability percentage. Similarly, a removable media robot 318 may also be limited to a certain number of hours that the robot can be used to mount and/or unmount removable media. Maximizing the usage of those resources during the resource lifetime of the resource reduces the resource cost and thus, reduces the operating costs of the storage service.

Figure 4:
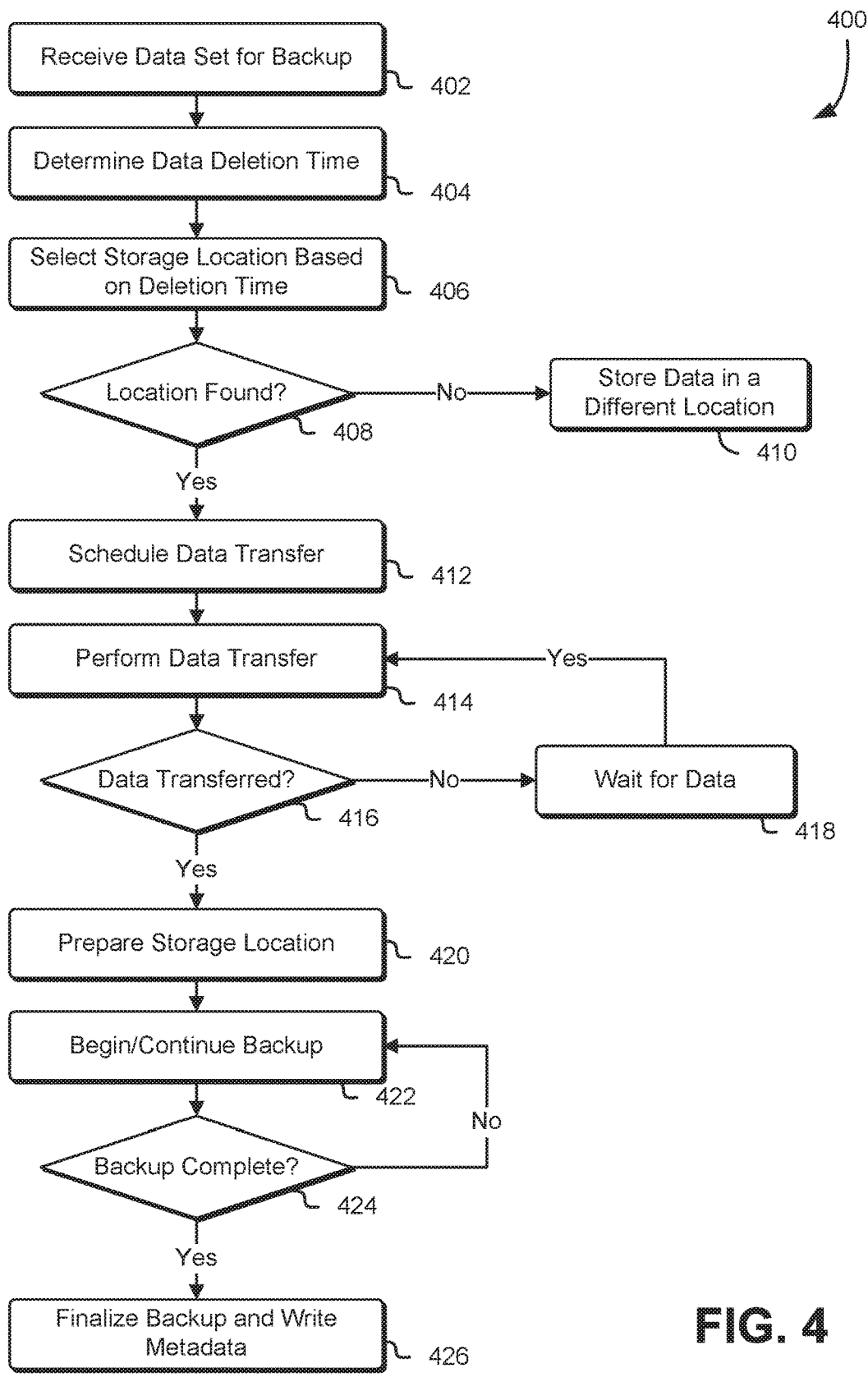
FIG. 4 illustrates an example process for analyzing backups and storing them incrementally in long-term data storage.

FIG. 4 illustrates an example process 400 for analyzing backups and storing them incrementally in long-term storage as described in connection with FIG. 1 and in accordance with an embodiment. A backup service such as the backup service 114 described in connection with FIG. 1 may perform the example process 400 illustrated in FIG. 4. A storage service such as the storage service 116 described in connection with FIG. 1 may also perform at least a part of the example process 400) illustrated in FIG. 4. In the example process 400 illustrated in FIG. 4, a backup service receives 402 a set of data for backup. The set of data for backup may be a backup data set derived from a data source, as described herein. The backup service may next determine 404 a data deletion time for the set of data for backup as described above and select 406 a storage location based at least in part on that deletion time, also as described above.

The backup service may next determine 408 if a data storage location based at least in part on that deletion time may be found. If the backup service does not determine 408 that a data storage location based at least in part on that deletion time may be found, the backup service may store 410 the data in a different location (i.e., a location that is not based at least in part on that deletion time and that may be selected based on some other criteria). Subsequent data with the same (or, in some embodiments, approximately the same) deletion time may then be stored in that new location. Conversely, if the backup service does determine 408 that a data storage location based at least in part on that deletion time may be found, the backup service may schedule 412 the data transfer from the data source to the backup service or from the data source to the storage service.

The backup service may schedule 412 the data transfer by, for example, determining the impact of the data transfer, the impact of other scheduled data transfers, and the available network bandwidth from the data source to the storage service. The backup service may schedule 412 the data transfer to minimize spikes of resource contention and aggregate the data transfer over the course of a time period. For example, if the backup service determines that one-hundred customers are each trying to schedule backups of one gigabyte ("GB") of data at midnight but none are scheduled for between one AM and three AM, the backup service may spread out the data transfers for these backups so that, for example, twenty-five are scheduled at midnight, twenty-five are scheduled at one AM, twenty-five at two AM, and twenty-five at three AM. It should be noted that the scheduling of data transfers may not impact the time when the data set for backup is produced. For example, in an embodiment, a data set for backup that is scheduled at midnight, but rescheduled for transfer at three AM is still produced at midnight but transferred to the storage service at three AM. In another embodiment, the data set for backup that is schedule at midnight, but rescheduled for transfer at three AM is produced at three AM, when it is time for it to be transferred to the storage service.

At the time when the data set to be backed up is scheduled for transfer, the backup service, the storage service, or another service associated with the backup service may perform 414 the data transfer to the storage service. The backup service, the storage service, or another service associated with the backup service may then determine 416 whether the data has been transferred and, if not, may wait 418 for the data transfer to complete.

After the backup service, the storage service, or another service associated with the backup service does determine 416 that the data has been transferred, the storage service may prepare 420 the storage location and may begin 422 the backup onto the destination within the storage service. Finally, when the backup is complete 424 the storage service and/or the backup service may finalize 426 the backup and may store any metadata associated with the backup, as described herein.

Figure 5:
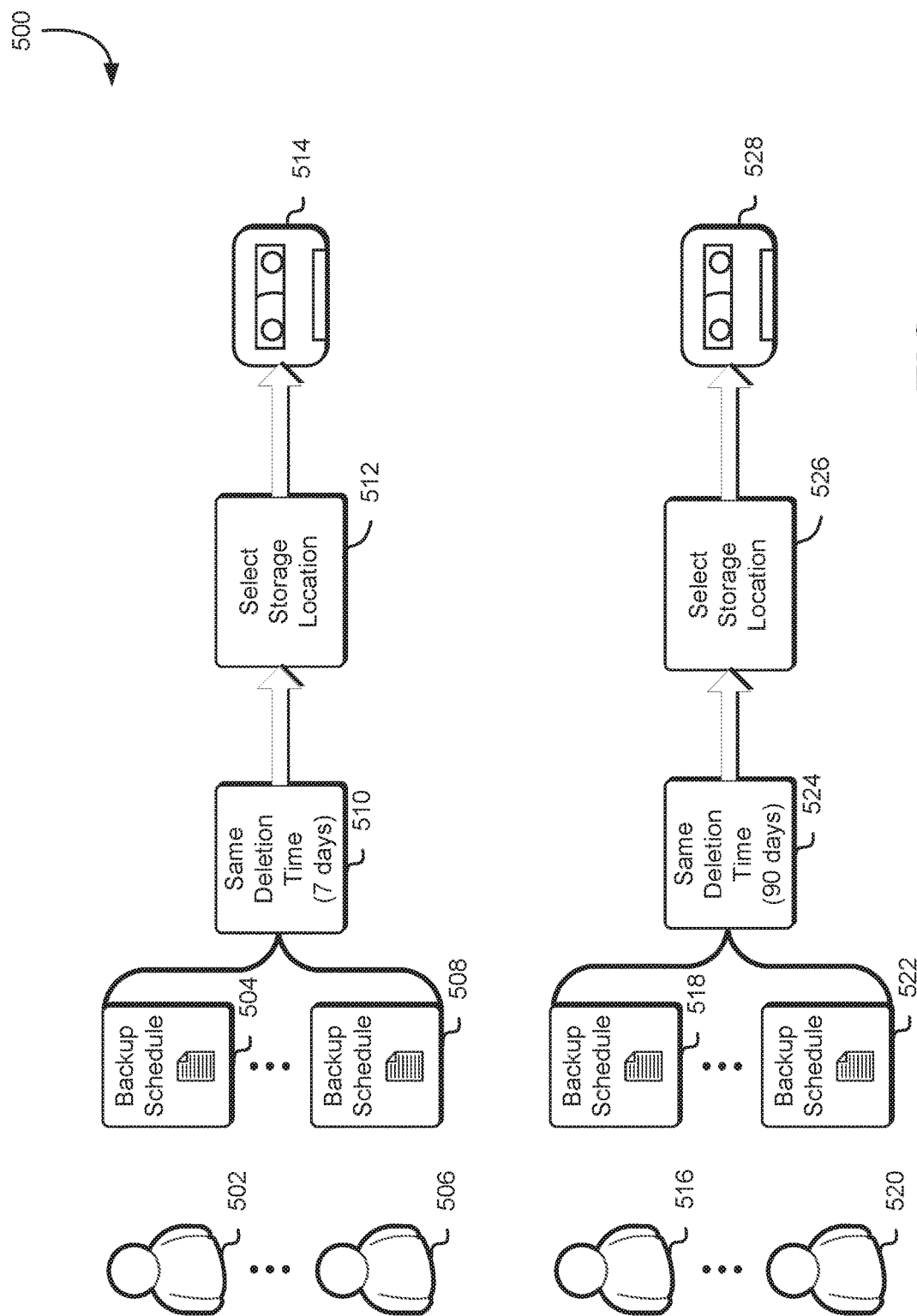
FIG. 5 illustrates an example environment where backups are grouped by deletion time in long-term data storage.

FIG. 5 illustrates an example environment 500 where backups are grouped by deletion time in long-term storage as described in connection with FIG. 1 and in accordance with an embodiment. In the example environment 500 illustrated in FIG. 5, a first set of customers (e.g., customer 502 to customer 506) produces a first set of backup schedules (e.g, backup schedule 504 to backup schedule 508) with the same deletion time 510 for deletion. In the example illustrated in FIG. 5, the same deletion time 510 is a date that is seven days in the future. Based on these same dates, a storage location is selected 512 and backed up to the storage system as represented by the removable media 514. Also in the example environment 500 illustrated in FIG. 5, a second set of customers (e.g., customer 516 to customer 520) produces a second set of backup schedules (e.g., backup schedule 518 to backup schedule 522) with the same deletion time 524 for deletion. In the example illustrated in FIG. 5, the same deletion time 524 is a date that is ninety days in the future. Based on these same dates, a storage location is selected 526 and backed up to the storage system as represented by the removable media 528.

It should be noted that, as used herein a first deletion time that is "the same" as a second deletion time is not intended to mean that the first deletion time and the second deletion time are identical. For example, a first deletion time that is January 15 at midnight is, for the purposes of this disclosure, the "same" as a second deletion time that is, for example, January 15 at four AM, or is the "same" as a third deletion time that is January 14 at noon. The threshold to determine whether two backup data sets have deletion times that are sufficiently close to one another to justify storing them together in the same data storage location may depend on a number of factors including, but not limited to, the size of the data, the size of the storage location, the type of the storage location, the size and type of other data sets in the data storage location, the volatility of the data, the sensitivity of the data, or a combination of these and/or other such factors. As may be contemplated, the factors that determine whether two backup data sets have deletion times that are sufficiently close to one another to justify storing them together in the same data storage location described herein are merely illustrative examples and other factors that determine whether two backup data sets have deletion times that are sufficiently close to one another to justify storing them together in the same data storage location may be considered as within the scope of the present disclosure.

Figure 6:
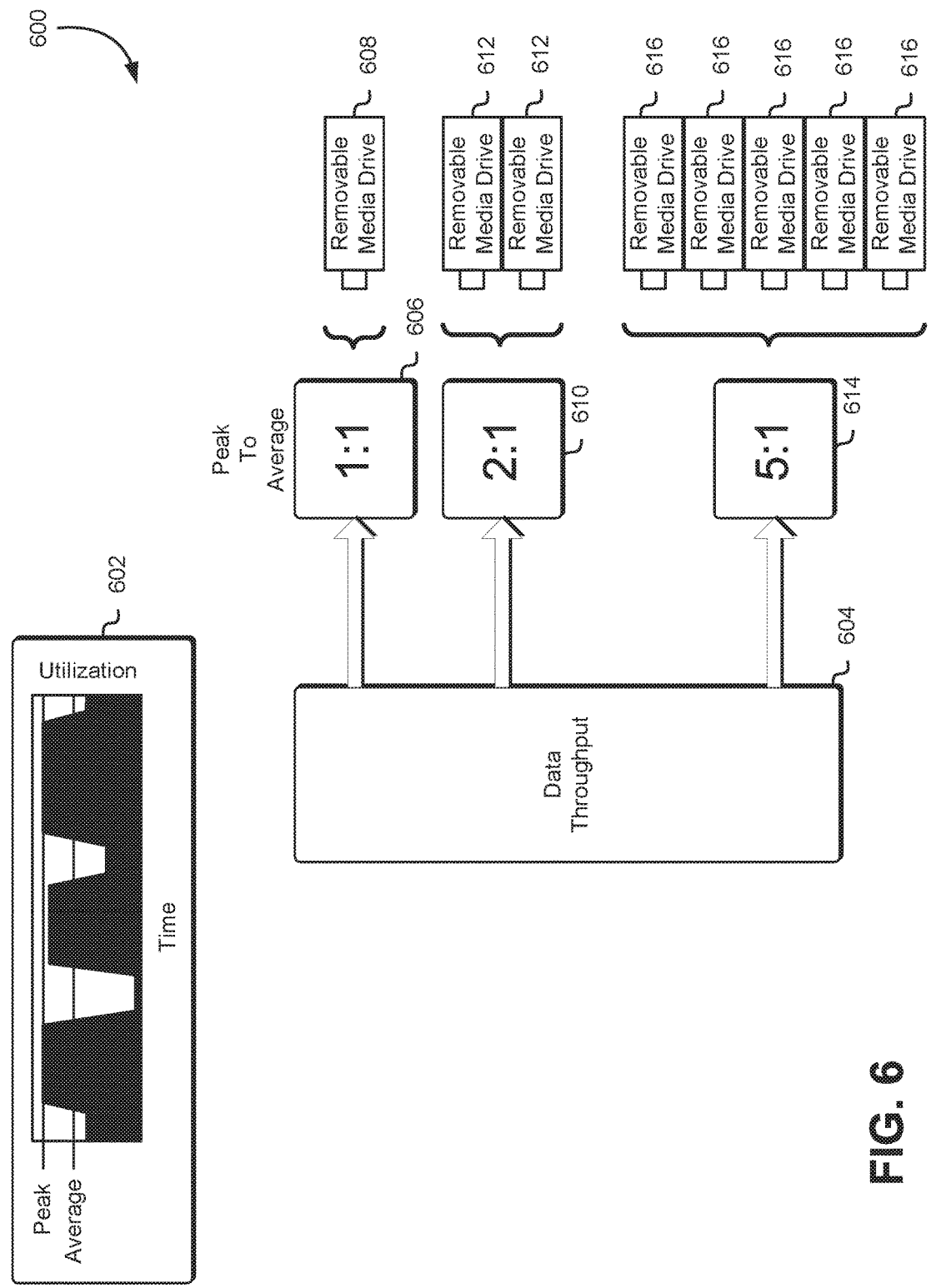
FIG. 6 illustrates an example diagram showing how resource utilization effects resource requirements in long-term data storage.

FIG. 6 illustrates an example diagram 600 showing how resource utilization effects resource requirements in long-term storage as described in connection with FIG. 1 and in accordance with an embodiment. In the example diagram 600 illustrated in FIG. 6, a graph 602 of resource utilization over time with a first line that indicates a peak value (i.e., the maximum value) over the time period and an average value over the time period. The data throughput 604 is an amount of data that is received at a critical point in the data path for a storage service (e.g., at a removable media rack such as the removable media rack 308 described in connection with FIG. 3). Based on changes in the peak to average ratio, different numbers of tape drives may be needed to process the data throughput 604.

For example, a first peak to average ratio 606 is 1:1, which means that the peak value and the average value for resource utilization over time are the same. In other words, the resource is utilized at 100% of the peak value at all times. A 1:1 peak to average ratio means that there are no spikes in the data. Assuming that a removable media drive may be 100% utilized, with a peak to average ratio 606 that is 1:1, one removable media drive 608 may be required to store the data represented by the data throughput 604. It should be noted that "one removable media drive" such as the one removable media drive 608 is used for illustrative purposes. That is, the one removable media drive 608 may be a set of removable media drives with any number of removable media drives.

A second peak to average ratio 610 is 2:1, which means that the average value for resource utilization over time is one half of the peak value. A resource with a 2:1 peak to average ratio has, over time, 50% utilization. A 50% utilization may result from data spikes or may result from frequent media changes in the storage service. For example, if a removable medium is being changed in a removable media drive, that removable media drive cannot be used to store data represented by the data throughput 604 until the removable medium change is complete. Assuming that a removable media drive may be 50% utilized, with a peak to average ratio 610 that is 2:1, two removable media drives 612 may be required to store the data represented by the data throughput 604. It should be noted that "two removable media drives" such as the two removable media drives 612 is used for illustrative purposes. That is, the two removable media drives 612 may be a set of removable media drives with twice the number of removable media drives as the number of removable media drives in the set of removable media drives 608. In other words, if the one removable media drive 608 is a set of one-hundred removable media drives, then the two removable media drives 612 is a set of two-hundred removable media drives.

A third peak to average ratio 614 is 5:1, which means that the average value for resource utilization over time is one fifth of the peak value. A resource with a 5:1 peak to average ratio has, over time, 20% utilization. A 20% utilization may result from frequent data spikes, long idle periods, frequent media changes in the storage service, or other underutilization factors. Assuming that a removable media drive may be 20% utilized, with a peak to average ratio 614 that is 5:1, five removable media drives 616 may be required to store the data represented by the data throughput 604. As with the "two removable media drives" discussed above, "five removable media drives" is used for illustrative purposes. That is, the five removable media drives 616 may be a set of removable media drives with five times the number of removable media drives as the number of removable media drives in the set of removable media drives 608. In other words, if the one removable media drive 608 is a set of one-hundred removable media drives, then the five removable media drives 616 is a set of five-hundred removable media drives.

Figure 7:
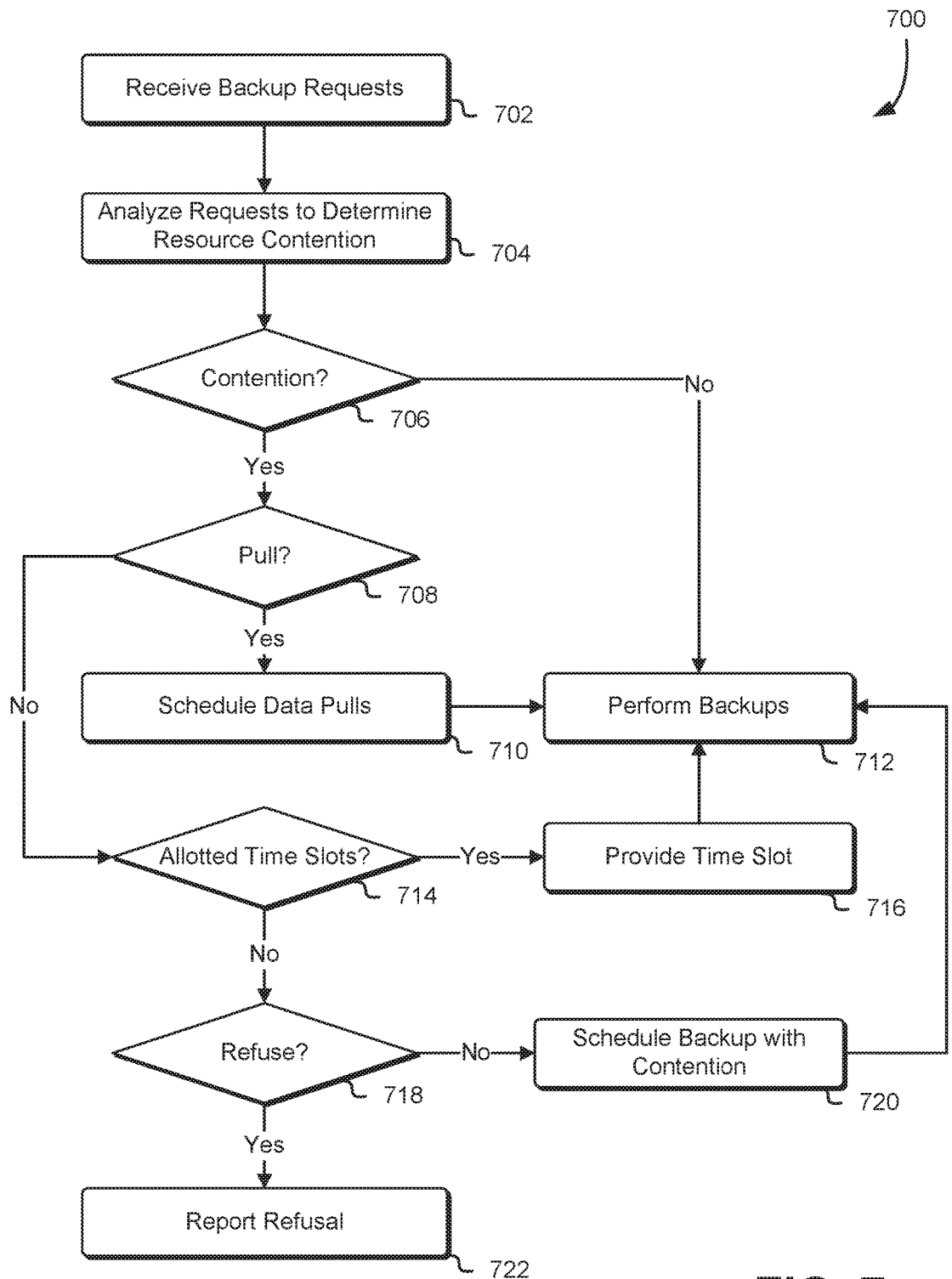
FIG. 7 illustrates an example process for mitigating resource contention when storing incremental backups in long-term data storage.

FIG. 7 illustrates an example process 700 for mitigating periods of high resource contention when storing incremental backups in long-term storage as described in connection with FIG. 1 and in accordance with an embodiment. A backup service such as the backup service 114 described in connection with FIG. 1 may perform the example process 700 illustrated in FIG. 7. A storage service such as the storage service 116 described in connection with FIG. 1 may also perform at least a part of the example process 700 illustrated in FIG. 7. In the example process 700 illustrated in FIG. 7, the backup service may first receive 702 backup requests and may then analyze the backup requests to determine 704 any possible upcoming periods of high resource contention such as, for example, an upcoming time period where a large number of backups may be scheduled.

If the backup service does not determine 706 that there are upcoming spikes in resource contention, the backup service may perform 712 the backups as scheduled. Conversely, if the backup service does determine 706 that there are upcoming spikes in resource contention based on, for example, the backup schedule, the backup service next may determine 708 whether a pull model may be used to mitigate the spikes in resource contention. A pull model is an example of a resource contention mitigation operation that may be used to mitigating spikes in resource contention by, rather than receiving the data from the data source as scheduled, the backup service requests the data (i.e., "pulls the data") from the data source when the backup service is ready to receive the data (e.g., several hours later). By pulling the data, periods of high resource contention can be mitigated, data spikes can be mitigated, and resource usage can be balanced. If the backup service does determine 708 to use a pull model, the backup service may schedule 710 the data pulls and, when the data is received, may perform 712 the backup at that time.

If the backup service does not determine 708 to use a pull model, the backup service may next determine 714 whether an allotted time slot model may be used to mitigate the periods of resource contention. An allotted time slot model is also an example of a resource contention mitigation operation that may be used to mitigating spikes in resource contention. In an allotted time slot model, the backup service assigns a time slot for a backup that is in the future. By assigning a time slot, periods of high resource contention can be mitigated, data spikes can be mitigated, and resource usage can be balanced. If the backup service does determine 714 to use an allotted time slot model, the backup service may provide 716 a time slot for the backup and may perform 712 the backup at that time.

If the backup service does not determine 714 to use an allotted time slot model, the backup service may next determine 718 whether the backup request may be refused. The backup request may be refused by the backup service if the backup may not be scheduled at a time of lower resource utilization and/or if an acceptable time slot is not found using the allotted time slot model. If the backup service does not determine 718 that the backup request may be refused, the backup service may then schedule 720 the backup at the scheduled time, even with the high resource contention and may perform 712 the backup at that time. In an embodiment, the backup service can perform operations to mitigate the periods of high resource contention by rescheduling other scheduled backups. If the backup service does determine 718 that the backup request may be refused, the backup service may report 722 the refusal to the customer requesting the backup. In an embodiment, the refused backup request can be rescheduled at a later time.

Figure 8:
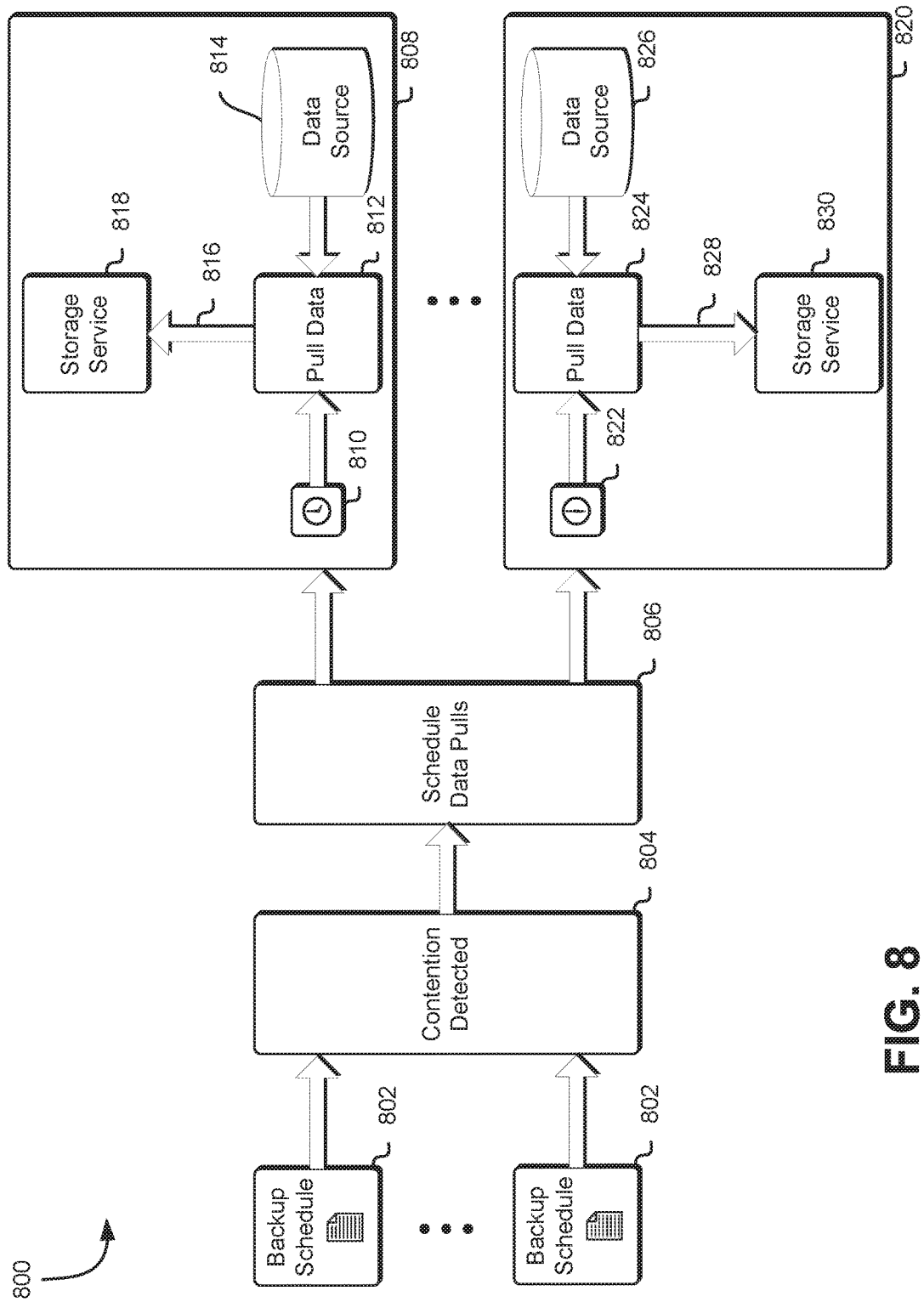
FIG. 8 illustrates an example environment where a period of high resource contention is mitigated using a pull-based model for incremental backups in long-term data storage.

FIG. 8 illustrates an example environment 800 where a period of high resource contention is mitigated using a pull-based model for incremental backups in long-term storage as described in connection with FIG. 1 and in accordance with an embodiment. In the example environment 800 illustrated in FIG. 8, one or more backup schedules 802 may be received and, as a result of those backup schedules 802, a period of high resource contention may be detected 804. Data pulls may then be scheduled 806. In a first scheduled data pull 808, at a time 810 a request to pull data 812 from the data source 814 may be made so that the backup data set may be sent 816 to the storage service 818. In an embodiment, the data is sent directly from the data source 814 to the storage service 818. In a second scheduled data pull 820, at a time 822 that is different from the time 810, a request to pull data 824 from the data source 826 may be made so that the backup data set may be sent 828 to the storage service 830. In an embodiment, the data is sent directly from the data source 826 to the storage service 830.

Figure 9:
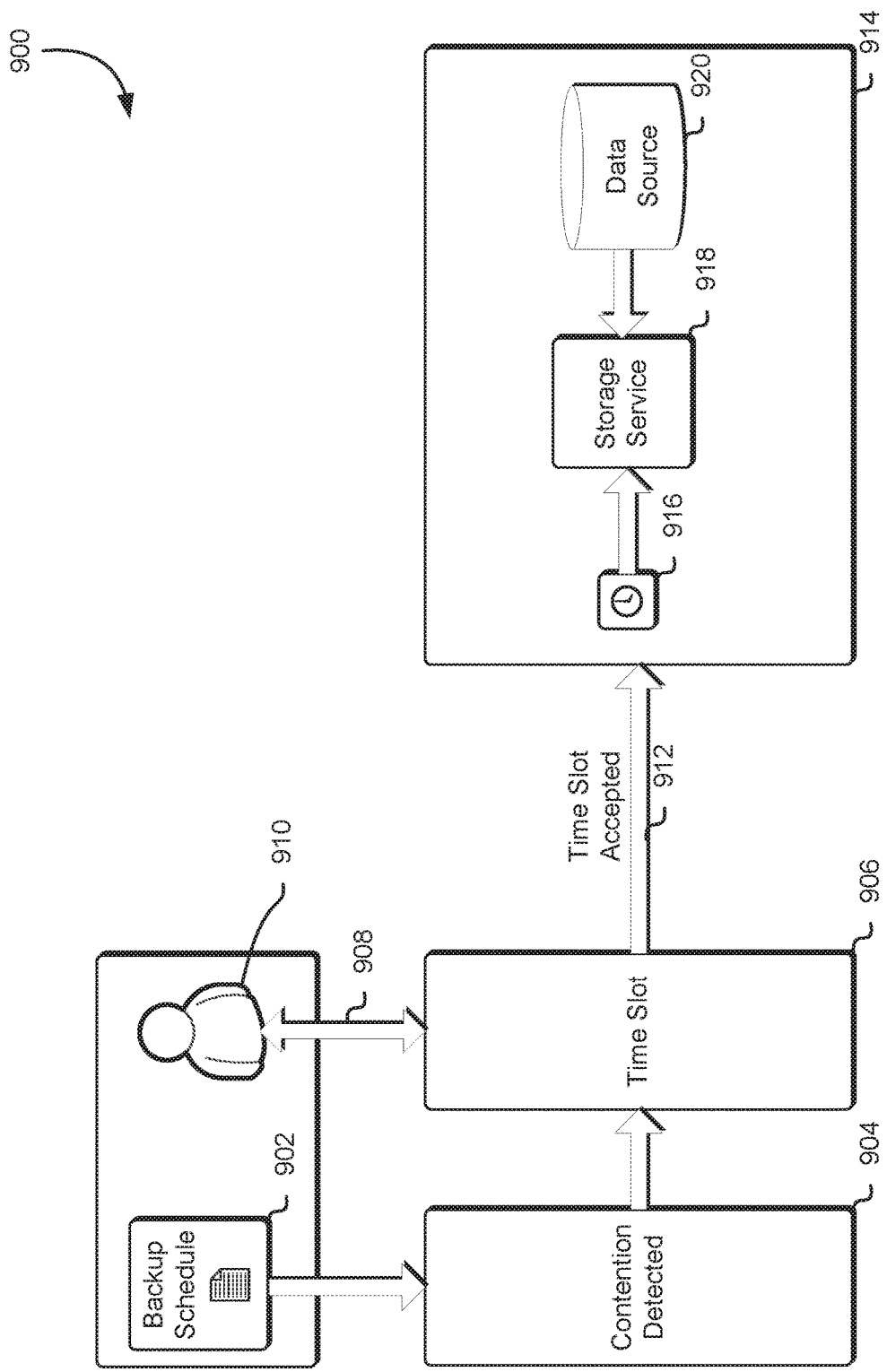
FIG. 9 illustrates an example environment where a period of high resource contention is mitigated using a timeslot-based model for incremental backups in long-term data storage.

FIG. 9 illustrates an example environment 900 where a period of high resource contention is mitigated using a timeslot-based model for incremental backups in long-term storage as described in connection with FIG. 1 and in accordance with an embodiment. In the example environment 900 illustrated in FIG. 9, a backup schedule 902 associated with a customer 910 is received and a period of high resource contention 904 is detected. Based on the period of high resource contention, one or more time slots 906 are selected and offered 908 to the customer 910. If the customer accepts a time slot 912, the backup 914 will be scheduled at that time. In the backup 914, at a time 916 corresponding to the accepted time slot, the storage service 918 may receive the backup data set based on the data source 920 (using either a push model, a pull model, or a combination of push and pull models). It should be noted that the example environment 900 illustrated in FIG. 9, one backup schedule 902 is illustrated for the sake of clarity. In an embodiment, a plurality of backup schedules are analyzed and processed according to the techniques described herein.

Figure 10:
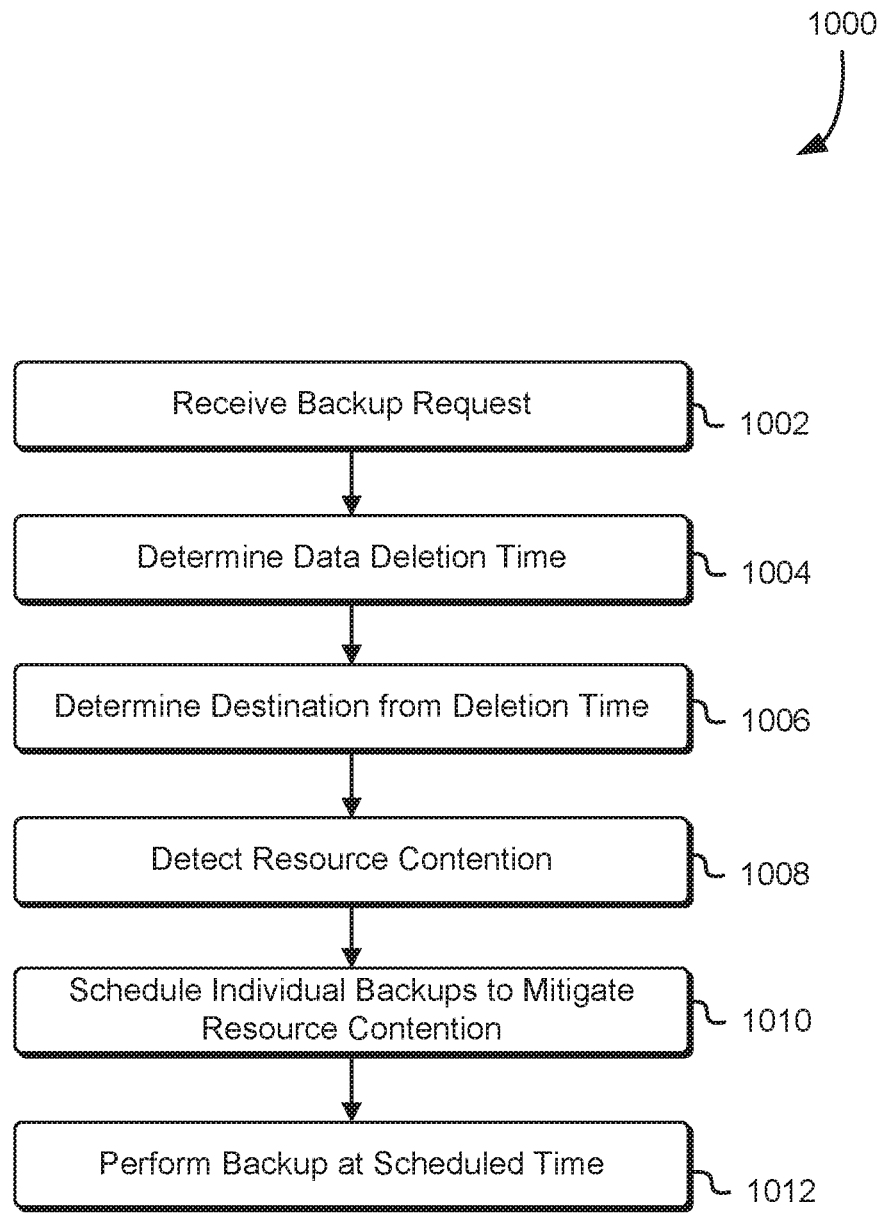
FIG. 10 illustrates an example process for storing backup data using incremental backups in long-term data storage.

FIG. 10 illustrates an example process 1000 for storing backup data using incremental backups in long-term storage as described in connection with FIG. 1 and in accordance with an embodiment. A backup service such as the backup service 114 described in connection with FIG. 1 may perform the example process 1000 illustrated in FIG. 10. A storage service such as the storage service 116 described in connection with FIG. 1 may also perform at least a part of the example process 1000 illustrated in FIG. 10. In the example process 1000 illustrated in FIG. 10, a backup service first receives 1002 a backup request, then determines 1004 the data deletion time as described herein. Based at least in part on that data deletion time, the backup service then determines 1006 a destination for the backup, which may be one of a plurality of backups for that deletion time. The backup service may then detect 1008 whether a period of high resource contention may occur and, using one of the techniques described herein, may schedule 1010 individual backups to mitigate the period of high resource contention. Finally, the backup service and/or the storage service may perform 1012 the backups at the scheduled time.

Figure 11:
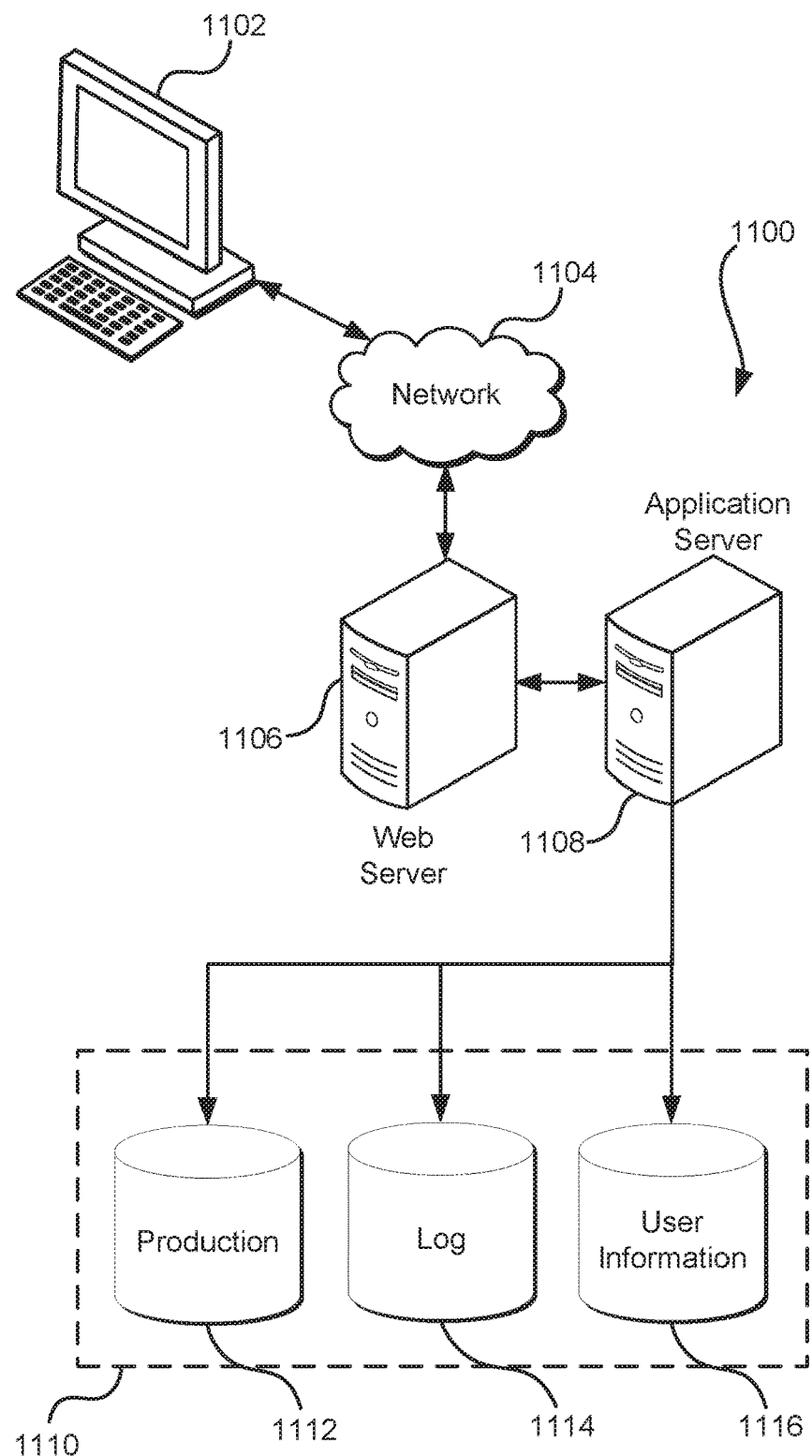
FIG. 11 illustrates an environment in which various embodiments can be implemented.

FIG. 11 illustrates aspects of an example environment 1100 for implementing aspects in accordance with various embodiments. As will be appreciated, although a web-based environment is used for purposes of explanation, different environments may be used, as appropriate, to implement various embodiments. The environment includes an electronic client device 1102, which can include any appropriate device operable to send and/or receive requests, messages, or information over an appropriate network 1104 and, in some embodiments, convey information back to a user of the device. Examples of such client devices include personal computers, cell phones, handheld messaging devices, laptop computers, tablet computers, set-top boxes, personal data assistants, embedded computer systems, electronic book readers, and the like. The network can include any appropriate network, including an intranet, the Internet, a cellular network, a local area network, a satellite network, or any other such network and/or combination thereof. Components used for such a system can depend at least in part upon the type of network and/or environment selected. Many protocols and components for communicating via such a network are well known and will not be discussed herein in detail. Communication over the network can be enabled by wired or wireless connections and combinations thereof. In this example, the network includes the Internet and/or other publicly-addressable communications network, as the environment includes a web server 1106 for receiving requests and serving content in response thereto, although for other networks an alternative device serving a similar purpose could be used as would be apparent to one of ordinary skill in the art.

The illustrative environment includes at least one application server 1108 and a data store 1110. It should be understood that there can be several application servers, layers or other elements, processes or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual, or clustered environment. The application server can include any appropriate hardware, software and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video and/or other content usable to be provided to the user, which may be served to the user by the web server in the form of HyperText Markup Language ("HTML"), Extensible Markup Language ("XML"), JavaScript, Cascading Style Sheets ("CSS"), JavaScript Object Notation (JSON), and/or another appropriate client-side structured language. Content transferred to a client device may be processed by the client device to provide the content in one or more forms including, but not limited to, forms that are perceptible to the user audibly, visually and/or through other senses. The handling of all requests and responses, as well as the delivery of content between the client device 1102 and the application server 1108, can be handled by the web server using PHP: Hypertext Preprocessor ("PHP"), Python, Ruby, Perl, Java, HTML, XML, JSON, and/or another appropriate server-side structured language in this example. Further, operations described herein as being performed by a single device may, unless otherwise clear from context, be performed collectively by multiple devices, which may form a distributed and/or virtual system.

The data store 1110 can include several separate data tables, databases, data documents, dynamic data storage schemes and/or other data storage mechanisms and media for storing data relating to a particular aspect of the present disclosure. For example, the data store illustrated may include mechanisms for storing production data 1112 and user information 1116, which can be used to serve content for the production side. The data store also is shown to include a mechanism for storing log data 1114, which can be used for reporting, analysis, or other such purposes. It should be understood that there can be many other aspects that may need to be stored in the data store, such as page image information and access rights information, which can be stored in any of the above listed mechanisms as appropriate or in additional mechanisms in the data store 1110. The data store 1110 is operable, through logic associated therewith, to receive instructions from the application server 1108 and obtain, update or otherwise process data in response thereto. The application server 1108 may provide static, dynamic, or a combination of static and dynamic data in response to the received instructions. Dynamic data, such as data used in web logs (blogs), shopping applications, news services, and other such applications may be generated by server-side structured languages as described herein or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the client device 1102. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed (i.e., as a result of being executed) by a processor of the server, allow the server to perform its intended functions.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 11. Thus, the depiction of the system 1100 in FIG. 11 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of computers, such as desktop, laptop or tablet computers running a standard operating system, as well as cellular, wireless and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems and other devices capable of communicating via a network. These devices also can include virtual devices such as virtual machines, hypervisors and other virtual devices capable of communicating via a network.

Various embodiments of the present disclosure utilize at least one network that would be familiar to those skilled in the art for supporting communications using any of a variety of commercially available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network, a satellite network, and any combination thereof. In some embodiments, connection-oriented protocols may be used to communicate between network endpoints. Connection-oriented protocols (sometimes called connection-based protocols) are capable of transmitting data in an ordered stream. Connection-oriented protocols can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers, Apache servers, and business application servers. The server(s) also may be capable of executing programs or scripts in response to requests from user devices, such as by executing one or more web applications that may be implemented as one or more scripts or programs written in any programming language, such as Java®, C, C#, or C++, or any scripting language, such as Ruby, PHP, Perl, Python, or TCL, as well as combinations thereof. The server(s) may also include database servers, including without limitation those commercially available from Oracle®, Microsoft®, Sybase®, and IBM®, as well as open-source servers such as MySQL, Postgres, SQLite, MongoDB, and any other server capable of storing, retrieving, and accessing structured or unstructured data. Database servers may include table-based servers, document-based servers, unstructured servers, relational servers, non-relational servers, or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAMV") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. In addition, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory, or other memory technology, Compact Disc Read-Only Memory ("CD-ROM"), digital versatile disk (DVD), or other optical storage, magnetic cassettes, magnetic tape, magnetic disk storage, or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory. In some embodiments, the code is stored on set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media may comprise multiple non-transitory computer-readable storage media and one or more of individual non-transitory storage media of the multiple non-transitory computer-readable storage media may lack all of the code while the multiple non-transitory computer-readable storage media collectively store all of the code. Further, in some examples, the executable instructions are executed such that different instructions are executed by different processors. As an illustrative example, a non-transitory computer-readable storage medium may store instructions. A main CPU may execute some of the instructions and a graphics processor unit may execute other of the instructions. Generally, different components of a computer system may have separate processors and different processors may execute different subsets of the instructions.

Accordingly, in some examples, computer systems are configured to implement one or more services that singly or collectively perform operations of processes described herein. Such computer systems may, for instance, be configured with applicable hardware and/or software that enable the performance of the operations. Further, computer systems that implement various embodiments of the present disclosure may, in some examples, be single devices and, in other examples, be distributed computer systems comprising multiple devices that operate differently such that the distributed computer system performs the operations described herein and such that a single device may not perform all operations.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method for managing incremental backups on removable media, comprising:
   receiving a backup request, the backup request including a location of a set of data to backup and a backup durability;
   generating a set of backup data from the set of data to backup;
   determining a deletion time for the set of data to backup based at least in part on the backup durability;
   determining, based at least in part on the deletion time, a destination from a plurality of destinations to store the set of backup data;
   detecting one or more periods of high resource contention at the destination, the one or more periods of high resource contention indicating a time period of high resource demand at the destination;
   scheduling the backup request at a scheduled time period different from the time period of high resource demand at the destination as a result of the one or more periods of high resource contention at the destination; and
   performing a backup of the set of backup data to the destination at the scheduled time period different from the time period of high resource demand at the destination.

2. The computer-implemented method of claim 1, wherein the backup request is one of a plurality of backup requests, each backup request of the plurality of backup requests having the same deletion time.

3. The computer-implemented method of claim 1, wherein the time period different from the time period of high resource demand is a time period at which the data to back up is requested from the location of the set of data to backup by a backup service, the time period at which the data to back up is requested from the location of the set of data to backup corresponding to a time period of low resource demand at the destination.

4. The computer-implemented method of claim 1, wherein the time period different from the time period of high resource demand is a time period provided to a customer of a backup service, the time period provided from a set of available time periods corresponding to time periods of low demand for resources at the destination.

5. A system, comprising:
   one or more processors; and
   memory that stores instructions that, as a result of being executed by the one or more processors, cause the system to:
   generate, from a set of data to backup, a backup data set that contains sufficient information to reproduce the set of data to backup;
   determine a deletion time for the backup data set, the deletion time based at least in part on a backup durability of the backup data set and used to determine a destination from a plurality of destinations;
   request a first scheduled time period to perform the backup;
   execute a resource contention mitigation operation in response to a determination that the first scheduled time period causes a period of high resource contention at the destination for the backup to produce a second scheduled time period to perform the backup; and perform the backup during the second scheduled time period.

6. The system of claim 5, wherein the destination is determined based at least in part on the deletion time.

7. The system of claim 5, wherein the destination is provided by a storage service that stores data on removable media.

8. The system of claim 5, wherein the resource contention mitigation operation retrieves the set of data to backup during the second scheduled time period.

9. The system of claim 5, wherein the resource contention mitigation operation:

provides the second scheduled time period to a customer associated with the backup data set; and receives an acceptance of the second scheduled time period from the customer.

10. The system of claim 5, wherein the second scheduled time period is the same as the first scheduled time period.

11. The system of claim 5, wherein the resource contention mitigation operation is a refusal to perform the backup, the refusal to perform the backup provided to a customer associated with the backup data set.

12. The system of claim 5, wherein, upon determining a second deletion time for a second data set is the same as the deletion time, the system stores the second data set at the destination.

13. A non-transitory computer-readable storage medium having stored thereon executable instructions that, as a result of being executed by one or more processors of a computer system, cause the computer system to at least:

generate a backup data set from a set of data to backup;

determine a deletion time for the backup data set;

select a destination for the backup based on the deletion time for the backup data set matching a deletion time of other data sets previously stored in the destination;

determine a scheduled time period to perform a backup of the backup data set, the scheduled time period to perform the backup determined based at least in part on a requested time period to perform the backup;

adjust the requested time period to produce the scheduled time period based at least in part on a determination that there is a period of high resource contention at the destination of the backup, the period of high resource contention occurring during the requested time period; and cause the backup data set to be sent to the destination at the scheduled time period.

14. The non-transitory computer-readable storage medium of claim 13, wherein the deletion time is based at least in part on a backup durability of the backup data set.

15. The non-transitory computer-readable storage medium of claim 13, wherein the instructions that cause the computer system to determine the scheduled time period to perform the backup further include instructions that, as a result of being executed by the one or more processors, cause the computer system to adjust the requested time period to produce the scheduled time period by performing a resource contention mitigation operation in response to a determination that the scheduled time period causes the period of high resource contention, at the destination, for the backup.

16. The non-transitory computer-readable storage medium of claim 15, wherein the resource contention mitigation operation includes at least one of: reschedule using a pull model, reschedule using an allotted time slot, or refuse.

17. The non-transitory computer-readable storage medium of claim 13, wherein the instructions that cause the backup data set to be sent to the destination at the scheduled time period further include instructions that, as a result of being executed by the one or more processors, cause the backup data set to be stored using a storage service.

18. The non-transitory computer-readable storage medium of claim 13, wherein the backup data set is an incremental backup, the incremental backup generated from a previous full backup, the previous full backup generated from a previous version of the set of data to backup, the incremental backup and the previous full backup collectively containing sufficient information to reproduce the set of data to backup.

19. The non-transitory computer-readable storage medium of claim 13, wherein the backup data set is an incremental backup, the incremental backup generated from a previous incremental backup and a previous full backup, the previous incremental backup generated from a first previous version of the set of data to backup, the previous full backup generated from a second previous version of the set of data to backup, the incremental backup, the previous incremental backup, and the previous full backup collectively containing sufficient information to reproduce the set of data to backup.

20. The non-transitory computer-readable storage medium of claim 13, wherein the backup data set is a full backup, the full backup containing sufficient information to reproduce the set of data to backup.

* * * * *